April 9, 1935.　　O. H. HARRISON ET AL　　1,996,996
UNIVERSAL JOINT
Filed July 25, 1932
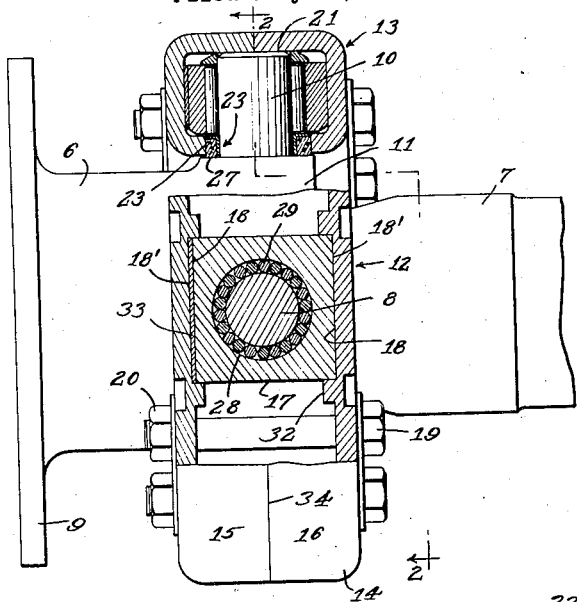
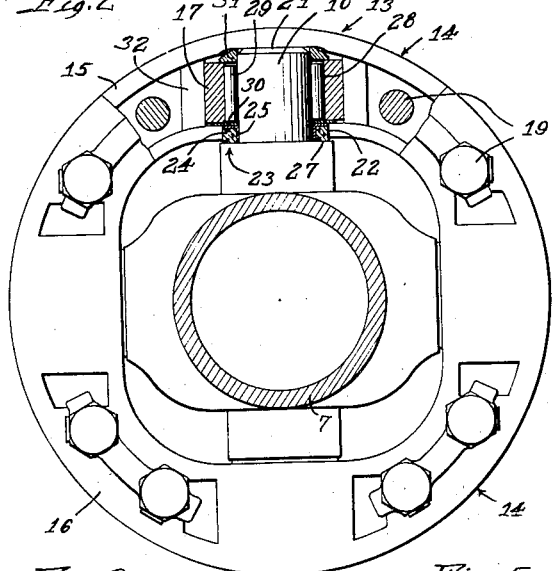
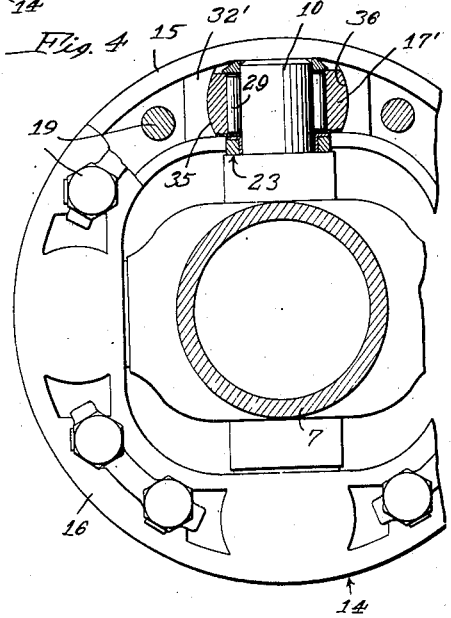
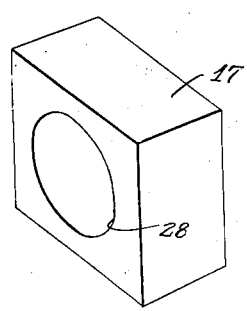
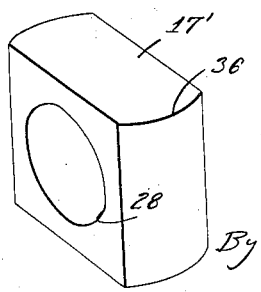
Inventors:
Oscar H. Harrison,
Carl E. Swenson, and
Oscar J. Larson
By Wilson, Dowell,
McCanna & Rehm
Attys Patented Apr. 9, 1935

1,996,996

UNITED STATES PATENT OFFICE 1,996,996

UNIVERSAL JOINT

Oscar H. Harrison, Carl E. Swenson, and Oscar J. Larson, Rockford, Ill., assignors to Mechanics Universal Joint Company, Rockford, Ill., a corporation of Illinois Application July 25, 1932, Serial No. 624,602

1 Claim. (Cl. 64—102)

This invention relates to universal joints of the trunnion type suitable for use on motor vehicles.

In Swenson Patent #1,673,925, there is disclosed a universal joint having a ring-shaped housing serving as an oil-tight container for the lubricant as well as a mounting for the trunnion bearings. It is the principal object of our invention to provide a practical joint of that kind having roller bearings instead of plain journal bearings. The roller bearings in accordance with our invention are so constructed whereby they may be assembled on the trunnions of the yoke members each as a complete sub-assembly, after which the two halves of the ring housing may be bolted thereto from opposite sides so as to mount the bearings in the housing and at the same time clamp the housing sections tightly together for retention of lubricant therein.

The invention is illustrated in the accompanying drawing, in which—

Figure 1 is a side view of a universal joint made in accordance with our invention illustrating one of the trunnion bearings in longitudinal section and another of the trunnion bearings in transverse section;

Fig. 2 is a view taken on the line 2—2 of Figure 1;

Fig. 3 is a perspective view of one of the bearing blocks removed from the joint;

Fig. 4 is a view similar to Fig. 2 but showing a modified or alternative construction, and Fig. 5 is a perspective view of one of the bearing blocks of Fig. 4.

Similar reference numerals are applied to corresponding parts throughout the views.

The universal joint comprises yokes 6 and 7, one of which is connected with the driving part and the other with the driven part. The yoke 7 is of the conventional forged type having diametrically opposed trunnions 8 suitably formed integral therewith. The yoke 6 on the other hand is stamped from sheet metal to provide a coupling flange 9 integral with the body portion thereof, the trunnions 10 being provided by the projecting ends of a pin driven through the portion 11 of the yoke, as set forth in the copending application of Oscar H. Harrison, Serial No. 587,694, filed January 20, 1932. Bearings for the trunnions 8 are indicated generally by the numeral 12, and other bearings for the trunnions 10 by the numeral 13. A ring-shaped housing 14 for connecting the trunnions as well as supplying lubricant thereto is made up of two sections 15 and 16 stamped from sheet metal, the section 15 being assembled on the yoke 6 before the pin which provides the trunnions 10 has been driven into place, and the section 16 being simply slipped over the end of the yoke into position alongside the trunnions 8. Disregarding for the moment the other details of construction of the bearings 12 and 13, it will be seen that they each comprise a bearing block 17 of rectangular cross-section, as indicated in Figure 1, having opposed parallel flat faces 18 for abutment with flat surfaces 18' on the inside of the sections 15 and 16, whereby to permit clamping the blocks in place by entering bolts 19 through registering holes in the housing sections and applying nuts 20 to the projecting threaded ends of said bolts. The tightening of the nuts clamps the housing sections together and causes tight engagement of the surfaces 18 with the surfaces 18' for a solid mounting of the bearings. The purpose of this construction is to provide a suitable power transmitting connection between the trunnions, while also allowing angular movement of one yoke with respect to the other, also to provide proper bearings for the trunnions and means for lubricating these bearings over a long period.

In accordance with the disclosure in the Swenson patent, the trunnions 8 and 10 find end thrust bearing support on flat surfaces 21 machined on the inside of the outer flange of the housing sections, and half round notches 22 are provided in the inner flanges of said sections to accommodate the trunnions and the packing means 23 encircling the same. The latter, in accordance with the patent, consists of a packing washer 24 on a ferrule 25 mounted with a sliding fit on the trunnion, and if desired a spring washer arranged to bear against the out-turned flange of the ferrule to urge the packing washer 24 against a shoulder 27 around the base of the trunnion. The spring washer is placed under compression by the bearing on the trunnion so as to urge the packing washer 24 into snug engagement with the shoulder 27, whereby to prevent leakage of oil along the trunnion and out over the yoke member. Furthermore, the packing washer 24 in each instance maintains an oil-tight joint between the housing structure and each trunnion, due to the fact that the packing is compressed in the clamping together of the housing sections. The universal joint is, therefore, completely sealed against loss of lubricant and also against entry of dirt and water.

The bearing construction should be clear from Figs. 1-3. The bearing block 17 has a cylindrical bearing recess 28 provided therein of the proper diameter to receive anti-friction rollers 29 therein around the trunnion 10, or 8 as the case may be, the rollers being arranged to run on the side of the trunnion on the one hand, and on the wall of the recess 28 on the other hand. A flat sheet metal ring 30 bearing againnst the top of the packing means 23 and against the bottom of the bearing block 17 to support the latter at the proper elevation with respect to the trunnion, has the flat lower ends of the rollers slidable freely on the smooth upper surface thereof. A ring 31 is pressed onto the upper end of the trunnion and bears against the top of the block to complete the bearing assembly. The upper flat ends of the rollers are arranged to slide freely on the smooth bottom surface of the ring.

In operation, the packing means 23 is assembled over the trunnion, after which the bearing block 17 and the ring 30 are dropped down in place to receive the rollers 29 therein around the trunnion. Then, the ring 31 is pressed down over the upper end of the trunnion in the manner described, compressing the spring washer, if one is provided in connection with the packing means 23, so as to place the packing means 23 under the desired pressure. The rollers 29 are of a uniform length such that they all have a predetermined clearance at their ends with respect to the rings 30 and 31 when the bearing is completely assembled, as shown in Fig. 2. Obviously, the various bearings each constitute a separate unitary sub-assembly on the yoke members to permit assembling of the joint, in the manner indicated in Fig. 2. When the housing 14 is fastened to the bearings 12 and 13 it is clear from an inspection of Fig. 2 that all of the bearings receive good lubrication by the washing therethrough of oil provided in the housing 14. One of the housing sections is usually provided with holes through which the housing may be filled with oil after the joint has been assembled, the holes being closed by suitable plugs.

The bearings 12 and 13 are simply clamped between the housing sections in the tightening of the nuts 20. Hence, it becomes important to provide some way of inter-connecting the bearing blocks with the housing sections so that they will be accurately located with respect to the housing and so that torque may be transmitted through the bearing blocks from the trunnions to the housing and ultimately from one yoke member to the other. For this reason we have the housing sections 15 and 16 stamped from a mild sheet steel, and form parallel inwardly projecting lugs 32 on each of the housing sections to receive the bearing blocks 17 therebetween, as best appears in Figure 1. These lugs are actually extruded by pressure between dies, and we have found that a very close degree of accuracy is possible so that if the width of the blocks 17 is maintained within a specified tolerance, the blocks will have a snug fit between the lugs, thus affording a good torque transmitting connection. In order further to insure a solid mounting of the bearing blocks on the housing, we provide shims 33 of rubber or any other suitable compressible material between the one face 18 of the blocks 17 and the surface 18' on the housing section. This enables one to tighten the nuts 20 to make a good oil-tight joint between the flanges of the housing sections at 34, without having to hold the blocks 17 accurately to a predetermined dimension between the faces 18 thereof. In other words, the blocks can be machined within an easy tolerance, to facilitate quantity production, and the compressible shims 33 may then be relied upon to compensate by the compression thereof for whatever irregularity there may be as to dimension.

In Fig. 4 a modified or alternative construction is disclosed in which the lugs 32' formed in the walls of the housing sections, instead of having parallel sides, are formed with arcuate sides 35 struck on a common center disposed in a plane passing through the axis of the trunnion, and the bearing block 17' has complementary curved sides 36 to fit between the lugs and permit turning about an axis coincident with the aforesaid center and at right angles to the axis of the trunnion as well as at right angles to the plane of the housing 14. The purpose of this construction is to make sure that the cylindrical bearing recess 28 is coaxial with the trunnion received therein, so as to eliminate any tendency for the bearing to bind. The bearing block is free to assume the proper relation to the trunnion and rollers without being under constraint whatever because of its mounting on the housing 14. The bearings, in the tightening of the bolts 19 and nuts 20 are simply clamped in their self-assumed positions. This feature of self aligning bearings naturally means minimum wear and generally improved operating efficiency, not to mention the fact that it facilitates assembling operations, and is a considerable factor in reducing the cost of production.

It is believed the foregoing conveys a good understanding of the invention, and while we have illustrated only a single working embodiment, it should be understood that various changes might be made in the construction without departing from the spirit and scope of the invention as expressed in the appended claim, in which—

We claim:

A universal joint comprising trunnion type yoke members, a sectional oil-tight transmission housing, bearing blocks fitting on said trunnions and disposed between the sections of said housing and arranged to be supported by the latter, the blocks having opposed flat faces for abutment with the side walls of the housing sections, each of said housing sections having inner and outer annular peripheral flanges having flat edges arranged for engagement so that the outer flanges form an outer oil-tight peripheral wall for said housing and the inner flanges form an inner oil-tight peripheral wall, bolts for fastening the housing sections together with the bearing blocks clamped firmly therebetween, the edges of said flanges having metal-to-metal contact, and compressible material interposed between the blocks and their abutting surfaces on the side walls of the housing sections placed under compression in the fastening together of the housing sections, whereby to insure oil-tight engagement between the edges of said flanges and solid mounting of the bearing blocks between the housing sections.

OSCAR H. HARRISON.
CARL E. SWENSON.
OSCAR J. LARSON.